Nov. 16, 1965    R. G. SPRINGSTEED    3,217,738
DRAWER-TYPE RETRACTABLE POWER HOSE REEL AND
WATER MIXING VALVE
Filed Sept. 19, 1963    3 Sheets-Sheet 1

Riley G. Springsteed
INVENTOR.

BY *Clarence A. O'Brien*
*and Harvey B. Jacobson*
Attorneys

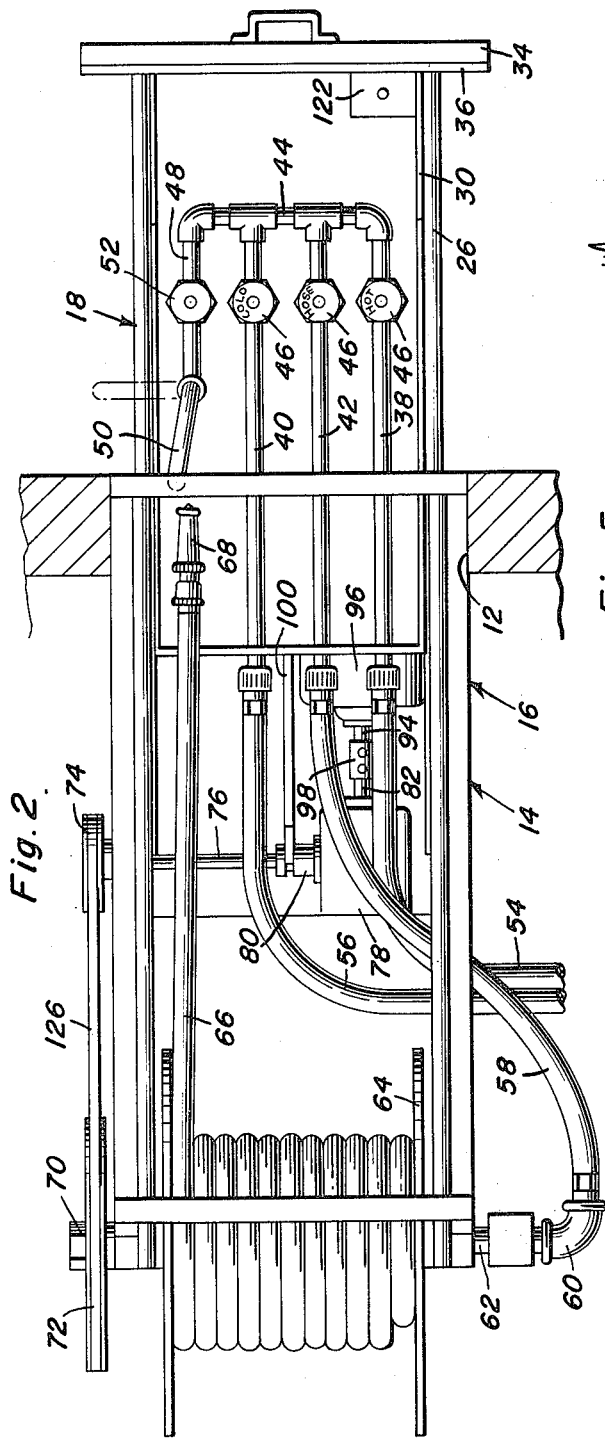
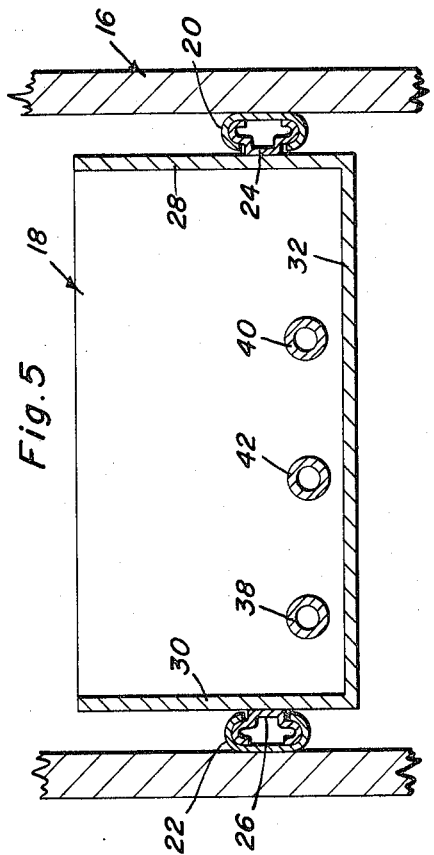

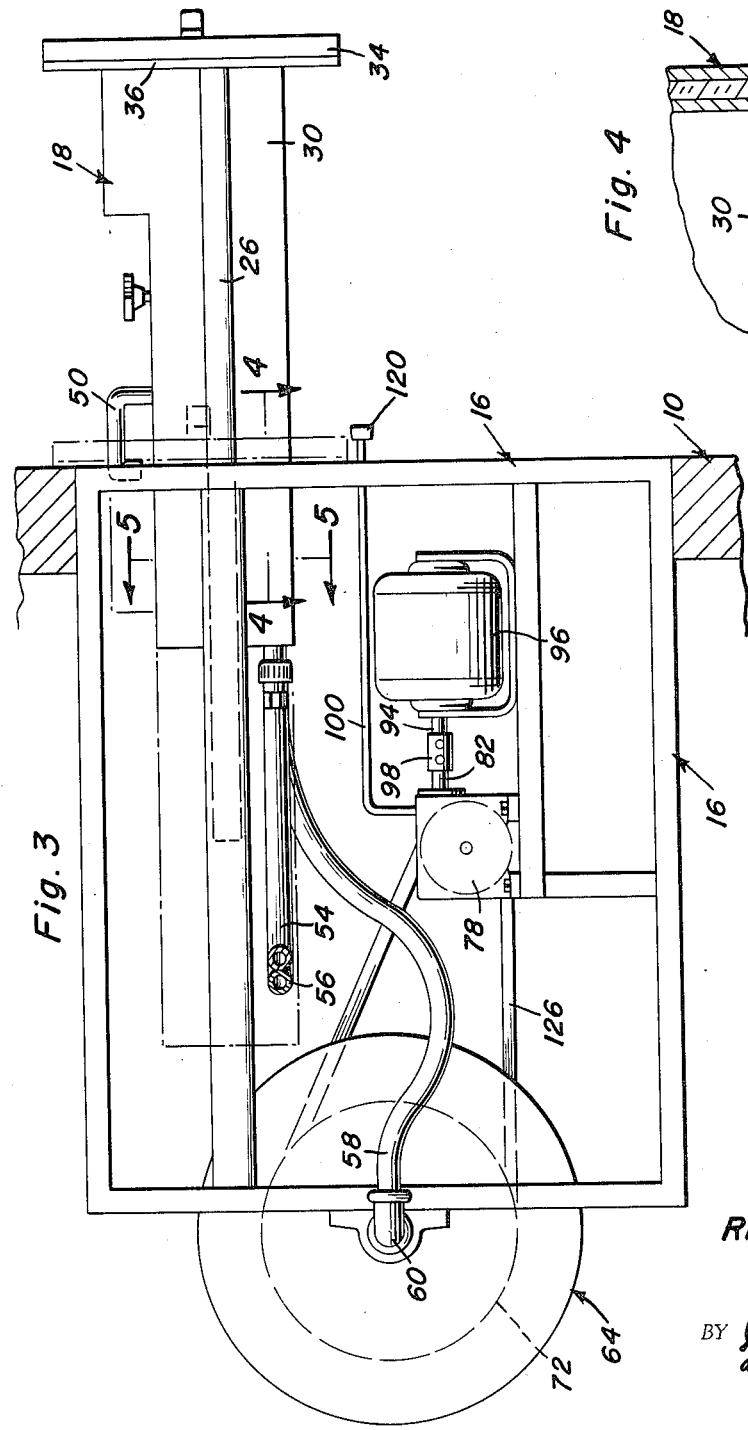

United States Patent Office 3,217,738
Patented Nov. 16, 1965

3,217,738
DRAWER-TYPE RETRACTABLE POWER HOSE REEL AND WATER MIXING VALVE
Riley G. Springsteed, 830 N. Ohio St., Aurora, Ill.
Filed Sept. 19, 1963, Ser. No. 310,097
2 Claims. (Cl. 137—355.2)

This invention relates to a novel and useful drawer-type retractable power hose reel and water mixing valve assembly, and more specifically to an assembly comprising a drawer adapted to be mounted, by means of suitable mounting framework, for movement between an open position and a closed position relative to an opening formed in a wall of a building structure or the like. The assembly includes three conduits which are supported from the drawer and are communicated at one set of corresponding ends with two of the ends of the other set of corresponding ends being adapted to be communicated with hot and cold water sources and the third conduit end of the other set of ends having one end of an elongated flexible hose communicated therewith whereby the other end of the hose may have either hot or cold water or a mixture of hot and cold water dispensed therefrom. The three conduits are provided with suitable control valves and in this manner the desired temperature of water can be obtained and the flow of water from the hose can be controlled as desired independently of the temperature of the water.

The hose reel and water mixing valve assembly has many uses both about the home and various types of businesses. There are times when persons using a hose would like to be able to use either hot or cold water or perhaps warm water for various purposes and the hose reel and water mixing valve assembly of the instant invention is particularly well adapted to provide a means whereby such a facility may be provided at a minimum cost and mounted in an unobtrusive manner. Further, the water mixing valve is constructed in such a manner that it may be readily operated.

The main object of this invention is to provide a retractable water mixing valve assembly mounted within a drawer which may be mounted for movement between an extended position and a recessed position in an opening formed in a wall structure.

A further object of this invention is to provide a water mixing valve assembly in accordance with the preceding object including means whereby either hot or cold water or a mixture of hot and cold water may be dispensed therefrom.

Yet another object of this invention is to provide an assembly including a dispensing unit in the form of a hose reel having a flexible hose wound thereon whereby the mixture of water dispensed from the assembly may be supplied to a remote location.

Another object of this invention is to provide the hose reel with motor means whereby the hose may be readily wound back on the reel after it has been used.

Still another object of this invention is to provide the hose reel with a fluid motor whereby the hose may be wound thereon by means of the fluid supply with which the mixing valve assembly is communicated.

A final object of this invention is to be specifically enumerated herein is to provide a hose reel and water mixing valve assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary horizontal sectional view taken substantially upon a plane passing through the wall in which the assembly is mounted at a point directly above the hose reel and the mixing valve assembly;

FIGURE 3 is a fragmentary enlarged vertical sectional view taken upon a plane passing through the opening formed in the wall structure in which the assembly is recessed, the assembly being shown in elevation;

FIGURE 4 is an enlarged fragmentary horizontal sectional view taken substantially upon a plane indicated by section line 4—4 of FIGURE 3;

FIGURE 5 is a fragmentary vertical sectional view on somewhat a larger scale taken substantially upon a plane indicated by section line 5—5 of FIGURE 3;

Figure 1:
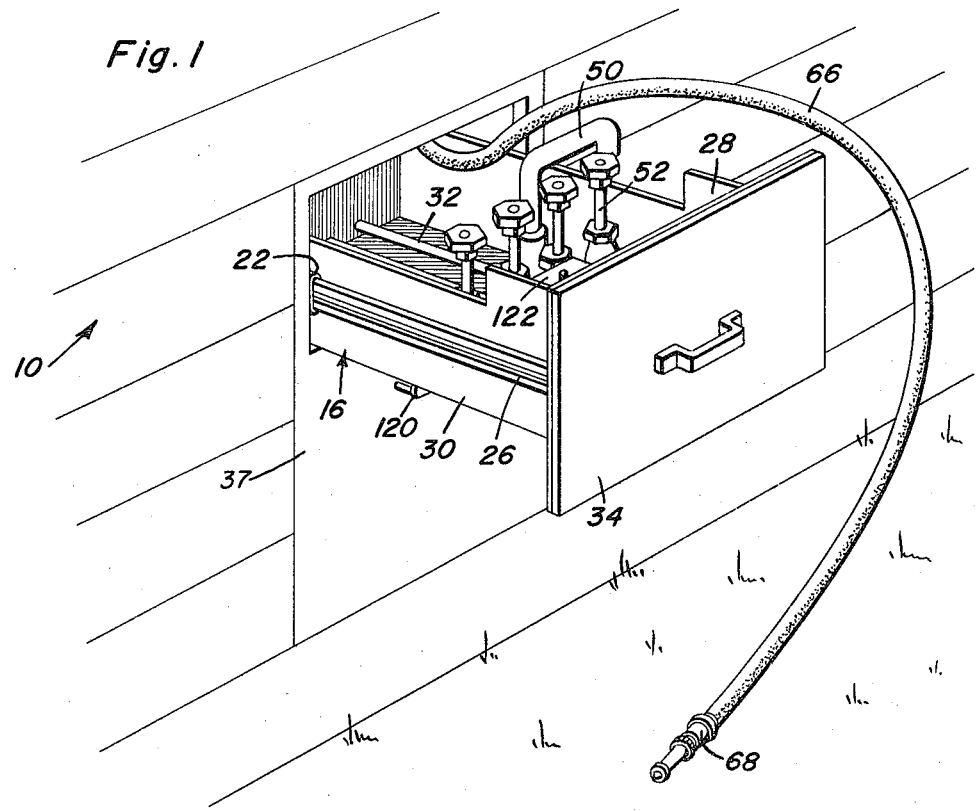
FIGURE 1 is a perspective view of the hose reel and water mixing valve assembly of the instant invention with the drawer portion thereof shown in the extended position and the outlet end of the flexible hose shown partially unwound from the reel.

Referring now more specifically to the drawings, the numeral 10 generally designates a wall construction in which an opening 12 has been formed. The hose reel and water mixing valve assembly of the instant invention is generally designated by the reference numeral 14 and includes a mounting frame generally referred to by reference numeral 16 which is recessed in the opening 12 and secured in position in any convenient manner and also slidably supports the drawer section of the assembly which is generally referred to by the reference numeral 18.

The mounting frame 16 includes a pair of generally horizontally disposed and opposing channels 20 and 22 in which is slidably received a pair of elongated guides 24 and 26, respectively, carried by the opposite side walls 28 and 30 of the drawer section 18. The drawer section 18 includes a bottom 32 and a front wall 34 which projects beyond the side walls 28 and 30 and above and below the upper and lower surface of the side walls. In addition, the front wall 34 is provided with a peripheral sealing strip 36 which is adapted to sealingly engage the opposing surfaces of the front plate 37, the mounting frame 16 and the outer surfaces of the wall 10 when the drawer section 18 is in the closed position as illustrated in phantom lines in FIGURE 3 of the drawings.

The drawer section 18 supports a first conduit 38, a second conduit 40, and a third conduit 42. The conduits 38, 40 and 42 are connected at one pair of corresponding ends by means of a branch conduit 44 and each of the conduits 38, 40 and 42 is provided with a control valve 46 for controlling the flow of fluid therethrough.

Still further, a fourth conduit 48 is provided and has one end communicated with the branch conduit 44 and a swivel outlet neck 50 communicated with its other end. The conduit 48 has a control valve 52 disposed therein which is similar to the control valve 46.

A pair of flexible conduits 54 and 56 are secured to the ends of the conduits 38 and 40 remote from the branch conduit 44 and is to be understood that the flexible conduits 54 and 56 are communicated with suitable sources of hot and cold water under pressure.

The end of the conduit 42 remote from the branch conduit 44 has one end of a flexible conduit 58 secured thereto and the other end of the flexible 58 is secured to the inlet end 60 of a water conduit 62 comprising a part of the hose reel assembly generally referred to by the reference numeral 64. The hose reel assembly 64 includes the stationary portion of the water conduit 62 to which one end of the flexible conduit 58 is secured and a rotatable reel 64 including an outlet (not shown) for the water conduit 62 which rotates with the reel 64 and has one end of the flexible hose 66 connected thereto. The other end of the flexible hose 66 is provided with a conventional nozzle 68. Accordingly, it may be seen that the drawer section 18 may be pulled to the extended position illustrated in FIGURES 2 and 3 of the drawings and that the control valve 46 of the conduit 42 may be opened together with at least one of the other control valves 46 to discharge water from the nozzle 68 after the nozzle end of the hose 66 has been pulled outwardly of the opening 12.

The reel 64 is rotatably journaled on a shaft 70 which is journaled from the mounting frame 16 and the shaft 70 has an input pulley 72 mounted thereon which is aligned with the driving pulley 74 of a lay shaft 76 whose other end is drivingly coupled to the output shaft (not shown) of a gear reduction assembly 78 by means of a clutch assembly 80. The gear reduction assembly 78 includes an input shaft 82 to which the output shaft 94 of an electric motor 96 is drivingly connected by means of coupling 98.

The clutch assembly 80 has an actuating rod 100 operatively connected thereto and the rod 100 extends outwardly of the mouting of front plate 37 and is provided with knob 120 on its outer end.

In operation, when it is desired to utilize the assembly 14, the drawer section 18 is first pulled to the open position. Then, the actuating rod 100 may be manipulated to disengage the clutch assembly 80 whereupon the hose 66 may be unwound from the reel 64. Then, the desired valves 46 and 52 may be manipulated in order to discharge the correct amount of water at the desired temperature. Then, when it is desired to wind the hose 66 on the reel 64, the switch 122 carried in the forward end of the drawer section 18 is actuated after the clutch assembly 80 has been manipulated by means of the actuating rod 100 to engage the gear reduction assembly with the lay shaft 76. Then, operation of the electric motor 96 will of course cause the reel 64 to wind the hose 66 thereon.

Figure 6:
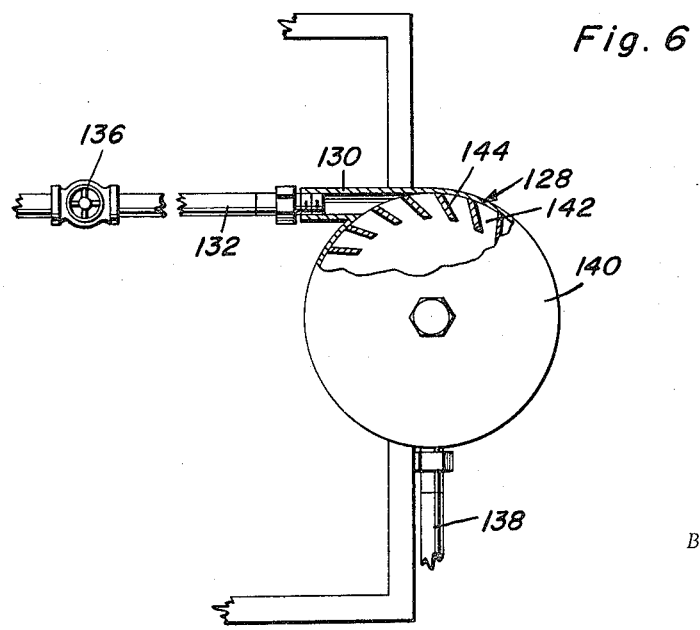
FIGURE 6 is a fragmentary side elevational view of the rear portion of the supporting frame for the drawer portion of the mixing valve assembly showing the manner in which a fluid motor may be utilized to power the hose reel, parts of the fluid motor being broken away and shown in sections.

It may be readily seen that the neck portion 50 may be utilized to dispense the desired quantity and temperature of water without interference with the reel 64 or hose 66. Further, from FIGURE 6 of the drawings it may be seen that the electric motor 96, gear reduction assembly 78 and the belt 126 which drivingly connects the pulley 74 with the pulley 72 may be dispensed with and replaced by a rotary fluid motor generally referred to by the reference numeral 128. The rotary fluid motor 128 is provided with an inlet 130 to which the outlet end of a conduit 132 is secured, the other end of the conduit 132 being communicated with the conduit 40 downstream of the corresponding control valve 46. In addition, the conduit 132 is provided with a control valve 136 and accordingly, the flow of water to the fluid motor 128 may be controlled. The fluid motor 128 includes an outlet 138 which may lead to a suitable drain and the casing 140 of the fluid motor 128 has a rotor 142 journaled therein. Water entering through the inlet 130 and striking the vanes 144 of the rotor 142 would of course cause the latter to rotate and it is to be understood that the rotor 142 will be drivingly coupled to the shaft 70 in lieu of the driven pulley 72. Accordingly, it may be seen that the fluid motor 128 is a modified form of motor means for winding the hose 66 on the reel 64 which may be used in lieu of the electric motor 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water mixing valve assembly including a mounting frame adapted to be secured in a wall opening, a drawer slidingly supported from said frame and including a front wall adapted to close said opening, a hose reel rotatably supported from said frame, said hose reel including water conduit means including an inlet end fixed relative to said frame and an outlet end rotatable with said reel, first, second and third water conduits stationarily supported relative to each other and said drawer and communicated at one set of corresponding ends, a pair of flexible conduit sections communicating two of the ends of the other set of corresponding ends of said conduits with hot and cold water sources supported in fixed position relative to said frame, an elongated flexible hose communicating the third conduit end of said other set of conduit ends with said inlet end of said hose reel conduit means, each of said conduits including a control valve for controlling the flow of water therethrough, a flexible hose wound on said reel and having an inlet end communicated with said outlet end of said hose reel water conduit means and an outlet end adapted to have a control valve operatively associated therewith.

2. The combination of claim 1 including a fourth water conduit stationarily supported relative to said drawer and having one end communicated with said one set of corresponding ends, the other end of said fourth conduit defining an outlet from which fluid may be drawn, and a control valve in said fourth conduit for controlling the flow of fluid therethrough.

References Cited by the Examiner
UNITED STATES PATENTS

| | | | |
|---|---|---|---|
| 1,325,116 | 12/1919 | Sebille | 137—606 X |
| 2,145,435 | 1/1939 | Smith | 4—10 |
| 2,514,862 | 7/1950 | Hannay | 137—355.2 |
| 2,603,384 | 7/1952 | Wieschel | 239—199 X |
| 2,814,809 | 12/1957 | Boyle | 4—187 |

FOREIGN PATENTS 682,401  11/1952  Great Britain.

M. CARY NELSON, *Primary Examiner.*

HENRY T. KLINKSIEK, *Examiner.*